(12) United States Patent
Ookubo et al.

(10) Patent No.: US 11,642,734 B2
(45) Date of Patent: May 9, 2023

(54) WIRE ELECTRICAL DISCHARGE MACHINE, MACHINING PROGRAM EDITOR, WIRE ELECTRODE MOVING METHOD AND MACHINING PROGRAM EDITING METHOD

(71) Applicant: FANUC CORPORATION, Yamanashi (JP)

(72) Inventors: Kousuke Ookubo, Yamanashi-ken (JP); Akihiko Fujimoto, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 682 days.

(21) Appl. No.: 16/744,472

(22) Filed: Jan. 16, 2020

(65) Prior Publication Data

US 2020/0238413 A1    Jul. 30, 2020

(30) Foreign Application Priority Data

Jan. 24, 2019  (JP) .............................. JP2019-009902

(51) Int. Cl.
*B23H 7/20* (2006.01)
*B23H 7/06* (2006.01)
*G05B 19/19* (2006.01)
*B23H 7/26* (2006.01)

(52) U.S. Cl.
CPC ................. *B23H 7/20* (2013.01); *B23H 7/06* (2013.01); *B23H 7/26* (2013.01); *G05B 19/19* (2013.01); *G05B 2219/45043* (2013.01); *G05B 2219/45221* (2013.01)

(58) Field of Classification Search
CPC .......... G05B 19/19; G05B 2219/45043; B23H 7/065; B23H 7/20
See application file for complete search history.

(56) References Cited

U.S. PATENT DOCUMENTS

| | | | |
|---|---|---|---|
| 5,852,268 A | 12/1998 | Buhler et al. | |
| 11,534,847 B2 * | 12/2022 | Watanabe | .............. B23H 7/065 |
| 2013/0220979 A1 | 8/2013 | Yamaoka | |
| 2014/0364992 A1 | 12/2014 | Abe | |

FOREIGN PATENT DOCUMENTS

| | | | |
|---|---|---|---|
| EP | 0939356 A2 | 9/1999 | |
| EP | 2889100 A2 * | 7/2015 | ............... B23H 1/02 |
| EP | 3031563 A1 | 6/2016 | |
| JP | 2013-173212 A | 9/2013 | |
| TW | 334372 B | 6/1998 | |

* cited by examiner

*Primary Examiner* — Geoffrey S Evans
(74) *Attorney, Agent, or Firm* — Robert P. Michal, Esq.; Carter, DeLuca & Farrell LLP

(57) ABSTRACT

A wire electrical discharge machine includes: a determination unit that determines whether or not a first route and a second route, each including an approach path, a machining path and an escape path in this order, are set in this order as a movement route of a wire electrode; and a wire movement control unit that, when the first route and the second route are determined to be set in a machining program in this order as the movement route of the wire electrode, causes the wire electrode to transition from the machining path of the first route to the machining path of the second route without moving the wire electrode along the escape path of the first route and the approach path of the second route.

16 Claims, 9 Drawing Sheets

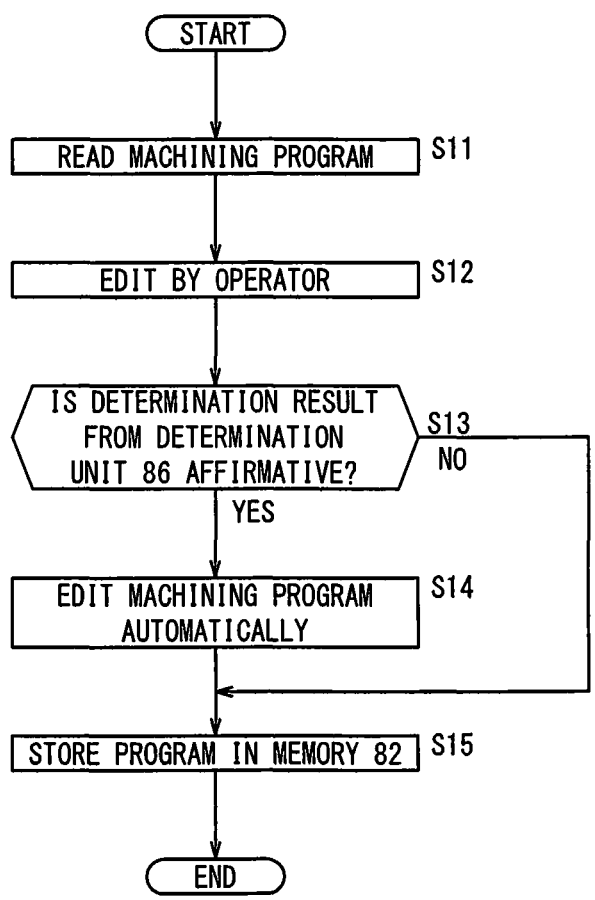

WIRE ELECTRICAL DISCHARGE MACHINE, MACHINING PROGRAM EDITOR, WIRE ELECTRODE MOVING METHOD AND MACHINING PROGRAM EDITING METHOD

CROSS-REFERENCE TO RELATED APPLICATION

This application is based upon and claims the benefit of priority from Japanese Patent Application No. 2019-009902 filed on Jan. 24, 2019, the contents of which are incorporated herein by reference.

BACKGROUND OF THE INVENTION

Field of the Invention

The present invention relates to a wire electrical discharge machine, a machining program editor, a wire electrode moving method and a machining program editing method.

Description of the Related Art

Japanese Laid-Open Patent Publication No. 2013-173212 discloses an electrical discharge machine that can perform an approach operation for moving a wire electrode from a machining start point to a workpiece (an object to be machined) and an escape operation for retracting the wire electrode from the workpiece to the machining start point.

SUMMARY OF THE INVENTION

A general wire electrical discharge machine that performs the above-described approach operation and escape operation cannot perform electrical discharge machining on a workpiece in most or all of the time periods during the approach operation and the escape operation. Therefore, it takes a long time for the wire electrical discharge machine disclosed in Japanese Laid-Open Patent Publication No. 2013-173212 to complete the electrical discharge machining when the approach operation and the escape operation are frequently performed until the workpiece is machined completely.

It is therefore an object of the present invention to shorten the time required for a wire electrical discharge machine to perform electrical discharge machining.

According to a first aspect of the invention, provided is a wire electrical discharge machine that performs electrical discharge machining on a workpiece by generating electric discharges between a wire electrode and the workpiece when moving the wire electrode relative to the workpiece along a machining path of a movement route of the wire electrode while moving the wire electrode relative to the workpiece based on a machining program in which the movement route of the wire electrode is set, the wire electrical discharge machine including: a determination unit configured to determine whether or not a first route and a second route are set in the machining program in this order as the movement route of the wire electrode, the first route and the second route each including an approach path configured to cause the wire electrode to approach a start point of the machining path from a predetermined machining start point, the machining path, and an escape path configured to retract the wire electrode from an end point of the machining path to the machining start point, the approach path, the machining path, and the escape path being arranged in this order; and a wire movement control unit configured to, when the determination unit has determined that the first route and the second route are set in the machining program in this order as the movement route of the wire electrode, move the wire electrode relative to the workpiece so that the wire electrode transitions from the machining path of the first route to the machining path of the second route without moving the wire electrode along the escape path of the first route and the approach path of the second route set in the machining program.

According to a second aspect of the invention, provided is a machining program editor that edits a machining program in which a movement route of a wire electrode of a wire electrical discharge machine is set, the movement route including a machining path used when performing electrical discharge machining on a workpiece while moving the wire electrode relative to the workpiece, the machining program editor including: a determination unit configured to determine whether or not a first route and a second route are set in the machining program in this order as the movement route of the wire electrode, the first route and the second route each including an approach path configured to cause the wire electrode to approach a start point of the machining path from a predetermined machining start point, the machining path, and an escape path configured to retract the wire electrode from an end point of the machining path to the machining start point, the approach path, the machining path, and the escape path being arranged in this order; and a program editing unit configured to, when the determination unit has determined that the first route and the second route are set in the machining program in this order as the movement route of the wire electrode, edit the machining program so as to cause the wire electrode to transition from the machining path of the first route to the machining path of the second route without moving the wire electrode along the escape path of the first route and the approach path of the second route.

According to a third aspect of the invention, provided is a wire electrode moving method of moving a wire electrode when moving the wire electrode relative to a workpiece along a machining path to perform electrical discharge machining on the workpiece, the wire electrode moving method including: a determination step of determining whether or not a first route and a second route are specified in this order as a movement route of the wire electrode, the first route and the second route each including an approach path configured to cause the wire electrode to approach a start point of the machining path from a predetermined machining start point, the machining path, and an escape path configured to retract the wire electrode from an end point of the machining path to the machining start point, the approach path, the machining path, and the escape path being arranged in this order; and a movement step of, when it has been determined at the determination step that the first route and the second route are set in a machining program in this order as the movement route of the wire electrode, moving the wire electrode relative to the workpiece so that the wire electrode transitions from the machining path of the first route to the machining path of the second route without moving the wire electrode along the escape path of the first route and the approach path of the second route.

According to a fourth aspect of the invention, provided is a machining program editing method for editing a machining program in which a movement route of a wire electrode of a wire electrical discharge machine is set, the movement route including a machining path used when performing electrical discharge machining on a workpiece while moving the wire electrode relative to the workpiece, the machining program editing method including: a determination step of determining whether or not a first route and a second route are set in the machining program in this order as the movement route of the wire electrode, the first route and the second route each including an approach path configured to cause the wire electrode to approach a start point of the machining path from a predetermined machining start point, the machining path, and an escape path configured to retract the wire electrode from an end point of the machining path to the machining start point, the approach path, the machining path, and the escape path being arranged in this order; and a program editing step of, when it has been determined at the determination step that the first route and the second route are set in the machining program in this order as the movement route of the wire electrode, editing the machining program so as to cause the wire electrode to transition from the machining path of the first route to the machining path of the second route without moving the wire electrode along the escape path of the first route and the approach path of the second route.

According to the present invention, the time required for a wire electrical discharge machine to perform electrical discharge machining can be shortened.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 9 is a flowchart showing part of a processing flow of the machining program editor according to the second embodiment.

DESCRIPTION OF THE PREFERRED EMBODIMENTS

Preferred embodiments of the present invention will be described in detail below with reference to the accompanying drawings.

First Embodiment

Figure 1:
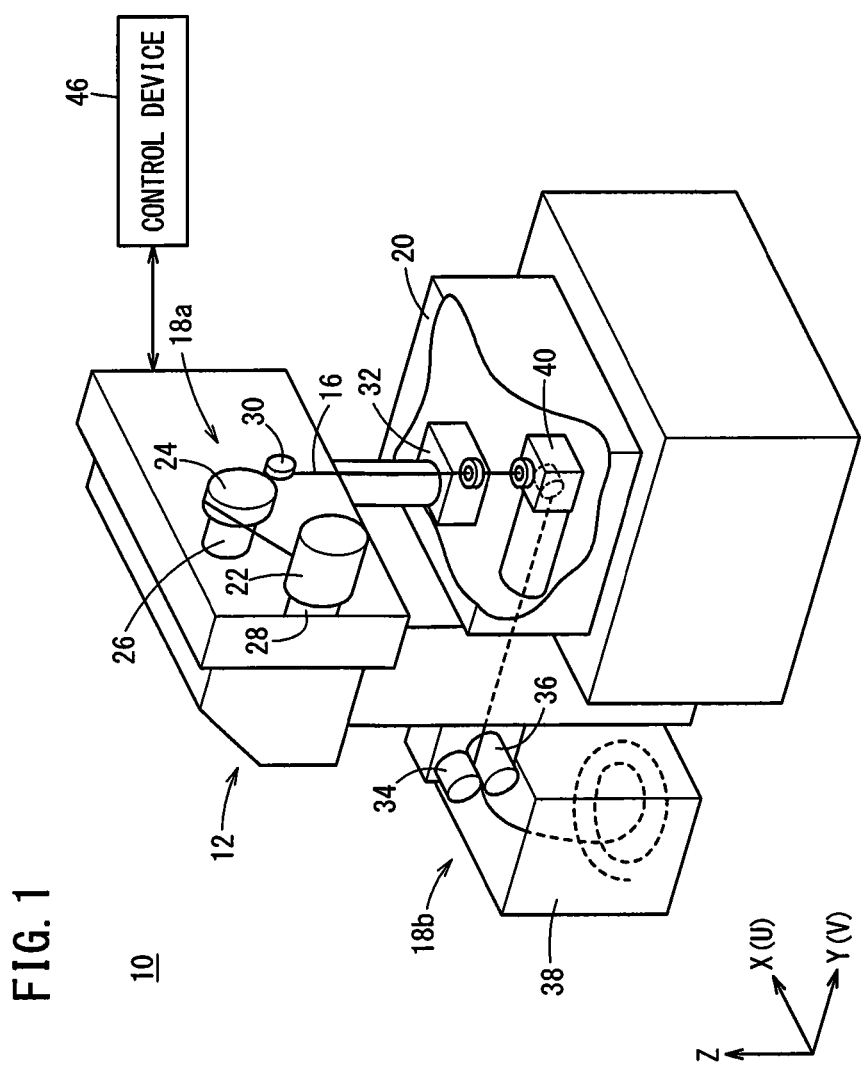
FIG. 1 is a perspective view showing a configurational example of a wire electrical discharge machine according to a first embodiment.

FIG. 1 is a perspective view showing a configurational example of a wire electrical discharge machine 10 according to a first embodiment. Note that the directions of the axes in the following description follow those shown in FIG. 1.

The wire electrical discharge machine 10 has a main body 12. The main body 12 includes a supply system 18a that supplies a wire electrode 16 toward a workpiece 14 (see FIG. 3), a collection system 18b that collects the wire electrode 16 that has passed through the workpiece 14, and a tank 20 that stores a dielectric working fluid.

The supply system 18a includes a wire bobbin 22, a brake shoe 24, a brake motor 26, a torque motor 28, a tension detector 30, and an upper wire guide 32. The wire electrode 16 is wound on the wire bobbin 22, and torque is applied by the torque motor 28. The brake shoe 24 applies a braking force by friction to the wire electrode 16 and is applied with a brake torque by the brake motor 26. The tension detector 30 detects the magnitude of the tension of the wire electrode 16. The upper wire guide 32 is arranged inside the tank 20 to guide the wire electrode 16 over the workpiece 14.

The collection system 18b includes a pinch roller 34, a feed roller 36, a wire collection box 38 and a lower wire guide 40. The pinch roller 34 and the feed roller 36 are provided to nip and transfer the wire electrode 16, and the transferred wire electrode 16 is collected into the wire collection box 38. The lower wire guide 40 is arranged inside the tank 20 to guide the wire electrode 16 under the workpiece 14.

The wire electrical discharge machine 10 can transfer the wire electrode 16 along the Z-axis direction by the supply system 18a and the collection system 18b. The upper wire guide 32 and the lower wire guide 40 included in the supply system 18a and the collection system 18b, respectively, are connected to unillustrated servo motors. By this configuration, each of the upper wire guide 32 and the lower wire guide 40 can be moved along the U-axis direction parallel to the X-axis, and the V-axis direction parallel to the Y-axis.

Figure 2:
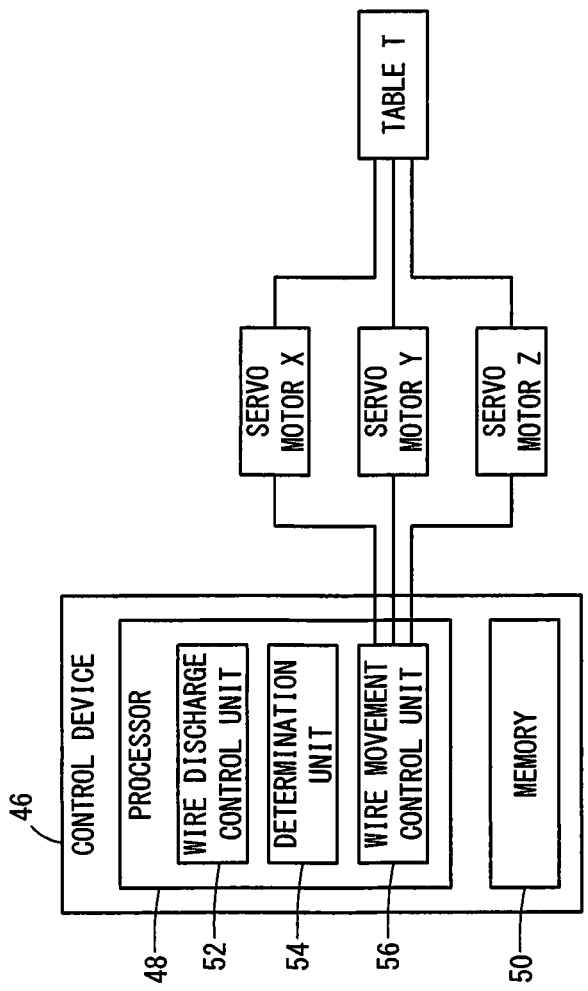
FIG. 2 is a block diagram schematically showing a configuration of a control device according to the first embodiment.

A table T that supports the workpiece 14 is provided inside the tank 20 (see FIG. 2). In the wire electrical discharge machine 10, the wire electrode 16 moves relative to the workpiece 14 by moving the table T. In order to realize this, at least three servo motors X, Y and Z are connected to the table T. The three servo motors X, Y and Z serve to move the table T along the X axis, the Y axis and the Z axis, respectively.

Figure 3:
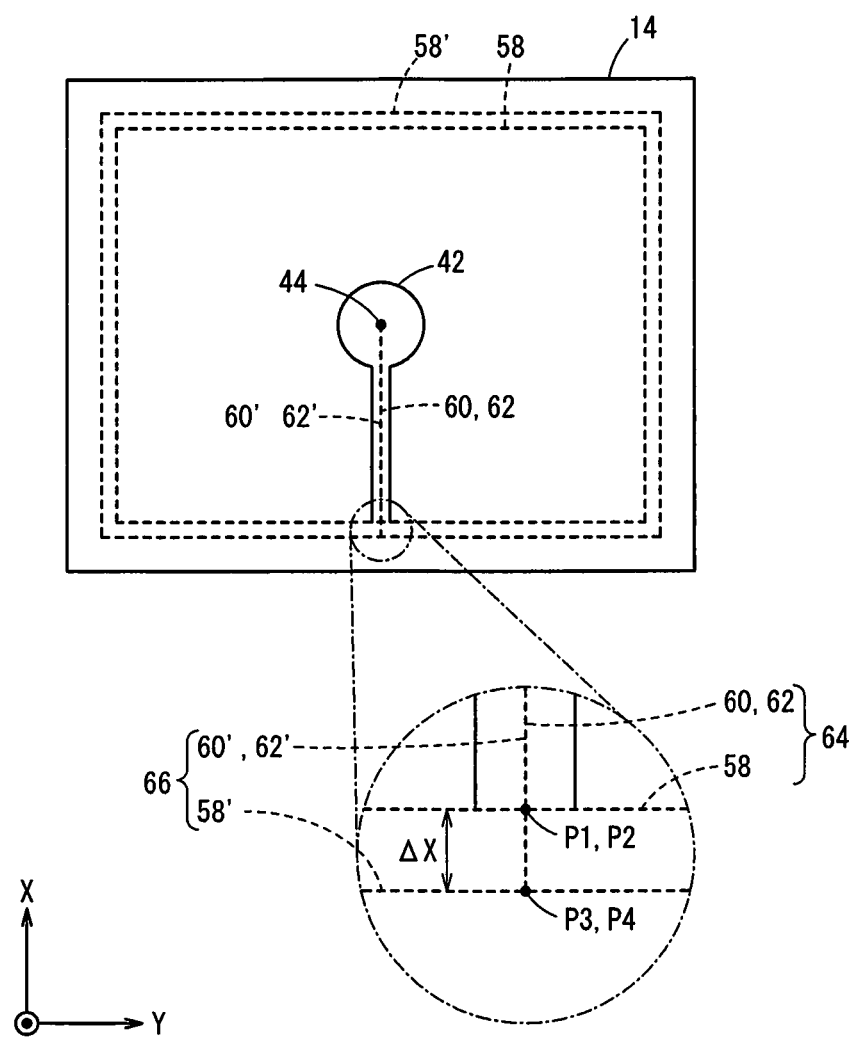
FIG. 3 is a plan view of a workpiece according to the first embodiment.

Prior to the execution of electrical discharge machining, a hole 42 is formed at a predetermined position of the workpiece 14 (see FIG. 3). In the area of the hole 42 in a plan view (XY coordinate system), a point called "machining start point 44" is specified in advance, for example, by an operator of the wire electrical discharge machine 10. The machining start point 44 is a position where the wire electrode 16 is fed between the upper wire guide 32 and the lower wire guide 40 when electrical discharge machining is to be performed on the workpiece 14.

When the wire electrode 16 is fed and the wire electrode 16 thus fed is brought close to the workpiece 14, a voltage is applied across a gap formed between the wire electrode 16 and the workpiece 14. As a result, electric discharge is generated in the dielectric working fluid, so that the workpiece 14 is subjected to electrical discharge machining. At the same time, the wire electrode 16 is moved relative to the workpiece 14, whereby the workpiece 14 can be machined 3-dimensionally.

FIG. 2 is a block diagram schematically showing a configuration of a control device 46 according to the first embodiment.

The wire electrical discharge machine 10 has the control device 46. The control device 46 of the present embodiment is a device that controls the relative movement of the wire electrode 16 to the workpiece 14 and control of electrical discharge machining in accordance with machining conditions. The control device 46 includes a processor 48 that reads a machining program A in which a movement route of the wire electrode 16 is set, and a memory 50 that stores the machining program A. In addition, the processor 48 includes a wire discharge control unit 52, a determination unit 54, and a wire movement control unit 56 as functional units.

A wire discharge control unit 52 is a functional unit that controls electrical discharge machining in accordance with machining conditions. In the present embodiment, the machining conditions indicate a combination of control parameters for specifying the control details of electrical discharge machining, including electrical and physical control conditions of the wire electrode 16 and injection conditions of the dielectric working fluid. For example, the magnitude of the voltage applied across the gap formed between the wire electrode 16 and the workpiece 14 when performing electrical discharge machining can be one of the control parameters included in the machining conditions. The machining conditions may be specified in advance by the operator via an unillustrated CNC and stored in the memory 50, for example. As for the machining conditions, another program for setting the machining conditions may be read by the processor 48 separately from the machining program A for setting the movement route of the wire electrode 16.

The wire movement control unit 56 is basically a functional unit for moving the wire electrode 16 relative to the workpiece 14 based on the movement route of the wire electrode 16 read from the machining program A. For example, the wire movement control unit 56 moves the table T by sending commands based on the contents set in the machining program A to the servo motors X, Y, and Z to which the table T is connected. As a result, the wire electrical discharge machine 10 of the present embodiment can move the wire electrode 16 relative to the workpiece 14 based on the movement route of the wire electrode 16 set in the machining program A. Thus, controlling electrical discharges by the wire discharge control unit 52 while controlling the relative movement of the wire electrode 16 by the wire movement control unit 56, realizes the above-described 3-dimensional machining on the workpiece 14.

The determination unit 54 is a functional unit for determining the configuration of the movement route of the wire electrode 16 set in the machining program A. Details of determination of the movement route of the wire electrode 16 performed by the determination unit 54 and details of the operation of the wire electrical discharge machine 10 according to the determination result will be described later.

Prior to detailed description of the determination unit 54, the machining program A read by the processor 48 of the wire electrical discharge machine 10 will be further described. The machining program A may be created by a general machining program editor. Here, a case where an operator creates a machining program A for performing an electrical discharge machining process that cuts out a workpiece 14 in a rectangular shape in a plan view by using a general machining program editor, will be described as an example. In addition, it is assumed that, when cutting the workpiece 14, the operator roughly forms the outer shape of the workpiece 14 by electrical discharge machining in which the workpiece 14 is roughly cut, then further performs finishing discharge machining on the rough surface of the workpiece 14.

FIG. 3 is a plan view of the workpiece 14 according to the first embodiment.

The operator sets a machining path 58 having a substantially rectangular shape shown in FIG. 3 in the machining program A. The machining path 58 is set here to perform electrical discharge machining for roughly forming the outer shape of the workpiece 14. The machining path 58 has multiple sections formed of line segments.

When the operator sets the machining path 58, a general machining program editor automatically sets an approach path 60 for moving the wire electrode 16 from the machining start point 44 to a start point P1 of the machining path 58, as an upstream route of the machining path 58. The general machining program editor further automatically sets an escape path 62 for retracting the wire electrode 16 from an end point P2 of the machining path 58 to the machining start point 44, as a downstream path of the machining path 58. By so doing, a "first route 64" having the approach path 60, the machining path 58 desired by the operator, and the escape path 62 in this order is set in the machining program A. In the example of FIG. 3, the start point P1 and the end point P2 of the machining path 58 have the same coordinates. Therefore, the approach path 60 and the escape path 62 are set so as to overlap each other in the example of FIG. 3.

Following the first route 64, the operator sets a machining path 58' having a substantially rectangular shape in the machining program A using a general machining program editor. The machining path 58' is set here to perform finishing discharge machining on the workpiece 14 under machining conditions different from those for the first route 64. The machining path 58' has multiple sections formed of line segments, similarly to the machining path 58.

When the operator sets the machining path 58', an approach path 60' and an escape path 62' are automatically set on the upstream and downstream sides of the machining path 58' as in the case of the first route 64. Accordingly, a "second route 66" having the approach path 60', the machining path 58' desired by the operator, and the escape path 62' in this order is set in the machining program A so as to follow the first route 64. In the example of FIG. 3, a start point P3 and an end point P4 of the machining path 58' have the same coordinates. Therefore, the approach path 60' and the escape path 62' are set so as to overlap each other in the example of FIG. 3.

In the machining program A, it is assumed that the start point P1 of the machining path 58 and the start point P3 of the machining path 58' have the same Y coordinate while the X coordinate of the start point P3 of the machining path 58' is more distant by Δx from the machining start point 44 (see the enlarged circle in FIG. 3). This relationship also applies to the end point P2 of the machining path 58 and the end point P4 of the machining path 58'. That is, it is assumed that the end point P4 of the machining path 58' is located at a position more distant from the machining start point 44 by Δx. Therefore, the approach path 60' and the escape path 62' partially overlap the approach path 60 and the escape path 62, and are longer than the approach path 60 and the escape path 62 by Δx in the X-axis direction. Further, it is assumed that the machining path 58' has a substantially rectangular shape that is marginally greater by Δx than the machining path 58.

According to the machining program A created as described above, the wire electrode 16 first moves relative to the workpiece 14 along the approach path 60, the machining path 58 and the escape path 62. Then, the wire electrode 16 moves relative to the workpiece 14 along the approach path 60', the machining path 58' and the escape path 62'. Further, the operator makes the wire discharge control unit 52 control electrical discharge machining along each of the machining path 58 and the machining path 58'. As a result, the operator can machine the workpiece 14 into a desired shape.

Note that, when the wire electrode 16 is relatively moved in accordance with the machining program A described above, no electrical discharge machining on the workpiece 14 is performed in the time periods in which the wire electrode 16 is not relatively moved along the machining path 58 of the first route 64 and the machining path 58' of the second route 66. In other words, electrical discharge machining is not performed in the time periods during which the wire electrode 16 is relatively moved along the approach path 60, the escape path 62, the approach path 60' and the escape path 62'.

From the viewpoint of the time efficiency of electrical discharge machining on the workpiece 14, it is preferable that the time during which electrical discharge machining is not performed is as short as possible. However, a general machining program editor automatically sets the approach path 60 and the escape path 62 on the upstream and downstream sides of the machining path 58 without any instruction from the operator. Therefore, it is difficult to exclude the approach path 60 and the escape path 62 from the contents of the machining program A created by the general machining program editor. This situation is the same for the case of the approach path 60' and the escape path 62'. It can be said that at least the approach path 60 of the first route 64 is difficult to eliminate in view of the fact that the electrical discharge machining itself is impossible unless the wire electrode 16 is brought close to the workpiece 14.

Figure 4:
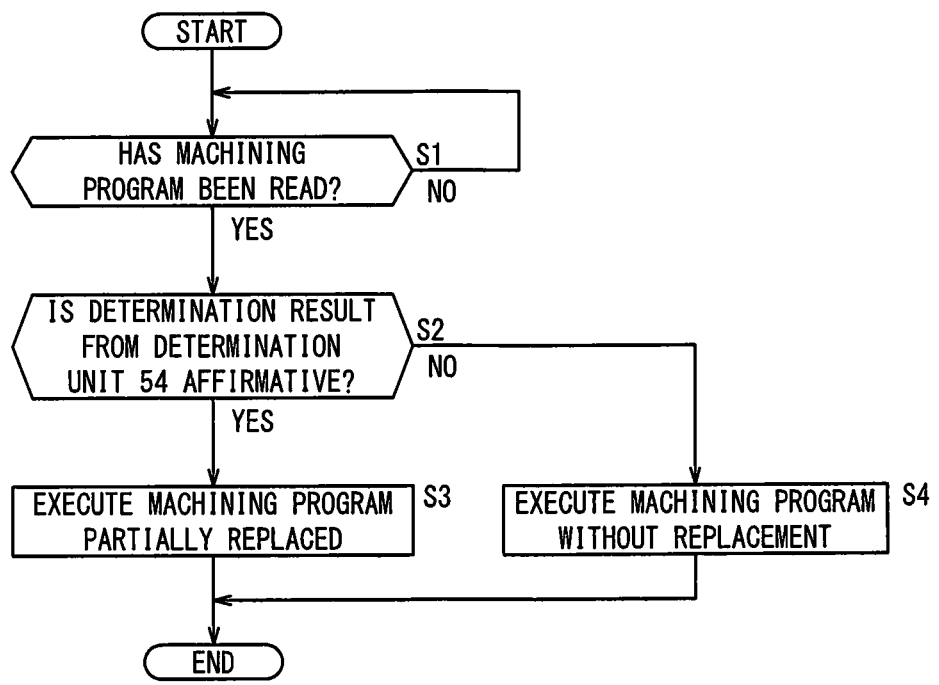
FIG. 4 is a flowchart showing part of a processing flow of the wire electrical discharge machine according to the first embodiment.

FIG. 4 is a flowchart showing part of a processing flow of the wire electrical discharge machine 10 of the first embodiment.

In the present embodiment, when the processor 48 reads the machining program A (step S1), the determination unit 54 determines the movement route of the wire electrode 16 set in the machining program A (step S2). Specifically, the determination unit 54 determines whether or not the first route 64 including the approach path 60, the machining path 58 and the escape path 62 is set in the machining program A. The determination unit 54 further determines whether or not the second route 66 having the approach path 60', the machining path 58', and the escape path 62' is set in the machining program A so as to follow the already determined first route 64. Then, when the first route 64 and the second route 66 have been set in the machining program A in this order (determination result: YES), the determination unit 54 requests the wire movement control unit 56 to execute the machining program A by replacing part of the machining program A.

In response to the request from the determination unit 54, the wire movement control unit 56 executes the machining program A in which part of the movement route of the wire electrode 16 is replaced (Step S3). Specifically, when the determination unit 54 has requested the wire movement control unit 56 to replace part of the machining program A, the wire movement control unit 56 does not relatively move the wire electrode 16 along the escape path 62 and the approach path 60' set in the machining program A, and then moves the wire electrode 16 relative to the workpiece 14 so that the wire electrode 16 makes a transition from the machining path 58 of the first route 64 to the machining path 58' of the second route 66. If there is no request to replace part of the machining program A from the determination unit 54, the wire movement control unit 56 may relatively move the wire electrode 16 as the machining program A specifies (step S4).

Figure 5:
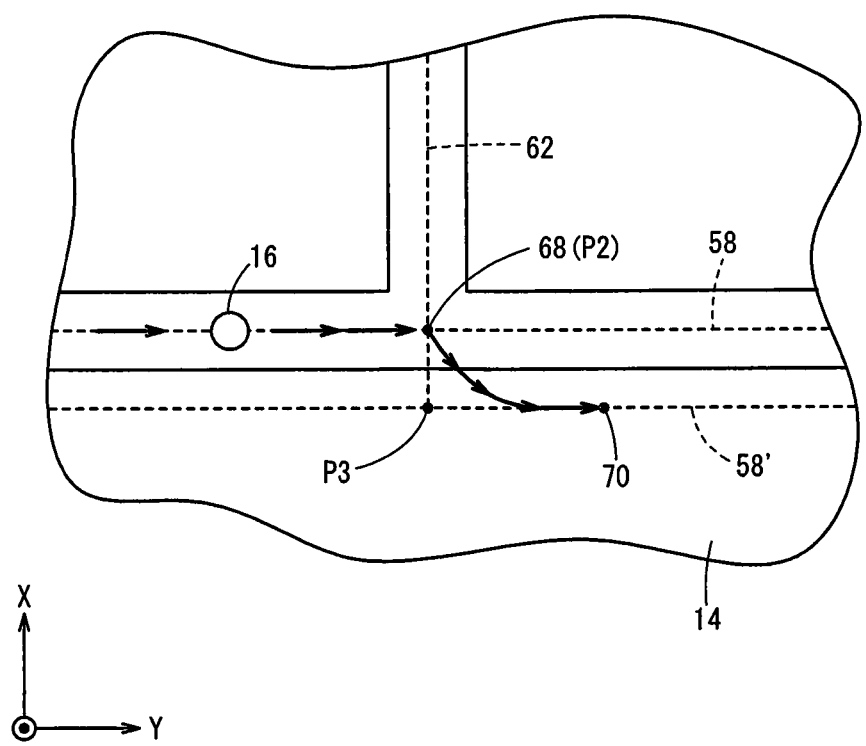
FIG. 5 is a plan view schematically showing how a wire electrode makes a route transition at step S3 of FIG. 4.

FIG. 5 is a plan view schematically showing how the wire electrode 16 makes a route transition at step S3 in FIG. 4.

When step S3 is executed, the wire electrode 16 transitions to a transition end point 70 on the machining path 58' of the second route 66 (arrow in FIG. 5) without making a transition from a transition start point 68 on the machining path 58 to the escape path 62 of the first route 64. As a result, electrical discharge machining in the second route 66 can be started immediately after completion of electrical discharge machining in the first route 64, without the wire electrode 16 passing through the escape path 62 and the approach path 60'. In the present embodiment, the transition start point 68 is the end point P2 of the machining path 58 of the first route 64. In the present embodiment, the transition end point 70 is preset by the operator at a position on the machining path 58' of the second route 66 and downstream of the start point P3 of the machining path 58' in the machining program A. The transition end point 70 may be changed within a predetermined range of the machining path 58' of the second route 66, including the start point P3 of the machining path 58'. The predetermined range of the machining path 58' of the second route 66, including the start point P3 of the machining path 58', is, for example, a section including the start point P3, among the multiple sections (line segments) of the machining path 58'.

In the present embodiment, as shown in FIG. 5, the wire electrode 16 is transitioned from the end point P2 of the machining path 58 toward the transition end point 70 located on the machining path 58' and downstream of the start point P3 of the machining path 58', in such a manner that the wire electrode 16 moves in a curve, forming an arc path in a plan view. This route transition of the wire electrode 16 to the machining path 58' makes it possible to suppress formation of streaks on the surface of the workpiece 14, compared to the case where the wire electrode 16 is brought close to the workpiece 14 in the direction orthogonal to the surface of the workpiece 14 (in the X-axis direction in the present embodiment).

After causing the wire electrode 16 to make a transition to the transition end point 70, the wire movement control unit 56 may relatively move the wire electrode 16 along the machining path 58' downstream of the transition end point 70. However, in this case, if the transition end point 70 is set downstream of the start point P3 of the machining path 58' in the machining program A as in the present embodiment, relative movement of the wire electrode 16 is not performed along the section of the machining path 58' upstream of the transition end point 70. That is, in this case, electrical discharge machining, which should have been performed in the section from the start point P3 to the transition end point 70 of the machining path 58', is not performed.

To deal with this, in the present embodiment, although electrical discharge machining is not performed along the section of the machining path 58' upstream of the transition end point 70, electrical discharge machining is performed instead while the wire electrode 16 transitions from the transition start point 68 to the transition end point 70. The machining conditions (transition machining conditions) at this time may be calculated by the wire electrical discharge machine 10. In the present embodiment, the wire discharge control unit 52 calculates transition machining conditions based on the machining conditions for the machining path 58 of the first route 64 and the machining conditions for the machining path 58' of the second route 66. Note that the machining conditions for the machining path 58 of the first route 64 and the machining conditions for the machining path 58' of the second route 66 both have been stored in the memory 50 in advance.

It is preferable that the transition machining conditions are calculated and configured so as to gradually change from the machining conditions for the machining path 58 to the machining conditions for the machining path 58' as the wire electrode 16 transitions from the machining path 58 of the first route 64 to the machining path 58' of the second route 66. In this way, it is possible to perform electrical discharge machining by connecting the machining paths 58 and 58', for which the machining conditions are different from each other, while the wire electrode 16 transitions from the transition start point 68 to the transition end point 70.

Thus, according to the wire electrical discharge machine 10 described above, it is possible to determine the movement route of the wire electrode 16 set in a general machining program A and control the relative movement of the wire electrode 16 based on the determination result so as to perform efficient relative movement. As a result, it is possible to shorten the time required for electrical discharge machining by the wire electrical discharge machine 10.

In the first embodiment, after the determination unit 54 determines the machining program A (step S2), the wire electrode 16 is moved immediately (step S3 or step S4). The processing flow of the wire electrical discharge machine 10 is not limited to this. For example, the wire movement control unit 56 may be configured to wait for the operator to issue an instruction to execute step S3 or step S4 via the CNC after the determination unit 54 determines the machining program A.

MODIFIED EXAMPLES

Although the first embodiment has been described as one example of the present invention, various modifications and improvements can be of course added to the above embodiment. It is also apparent from the scope of claims that the mode added with such modifications and improvements should be incorporated in the technical scope of the invention.

Modified Example 1

Figure 6:
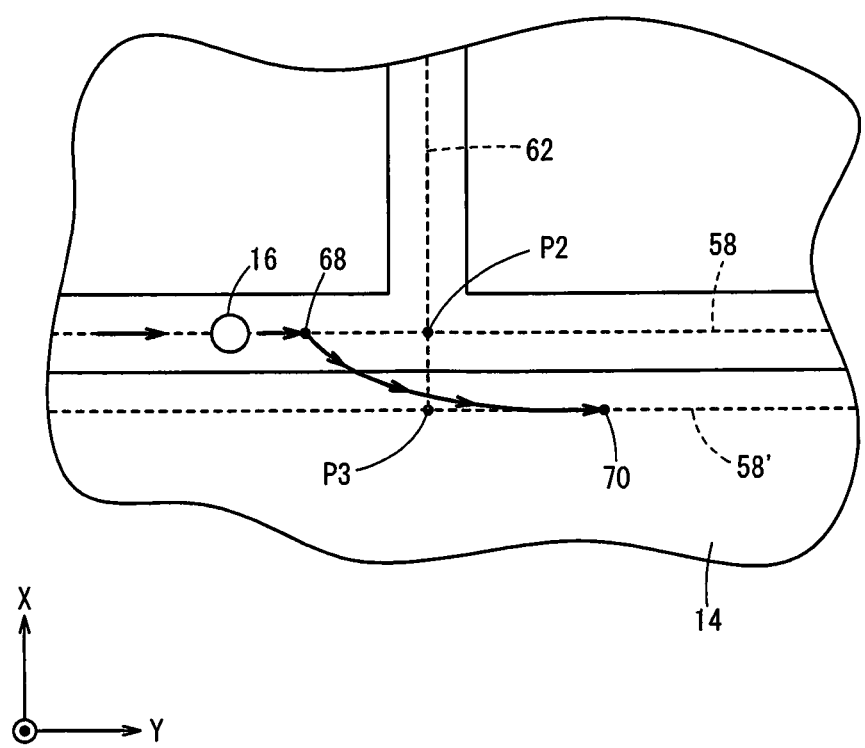
FIG. 6 is a plan view schematically showing how the wire electrode makes a route transition in a modified example 1.

FIG. 6 is a plan view schematically showing how the wire electrode 16 makes a route transition in a modified example 1.

The transition start point 68 is not limited to that in the first embodiment, and may be determined in advance by the operator within a predetermined range of the machining path 58 of the first route 64, including the end point P2 of the machining path 58. The predetermined range of the machining path 58 of the first route 64, including the end point P2 of the machining path 58 is, for example, a section including the end point P2, among the multiple sections (line segments) of the machining path 58. FIG. 6 shows an example of the transition of the wire electrode 16 when the transition start point 68 is set upstream of the end point P2 on the machining path 58.

Modified Example 2

Figure 7A:
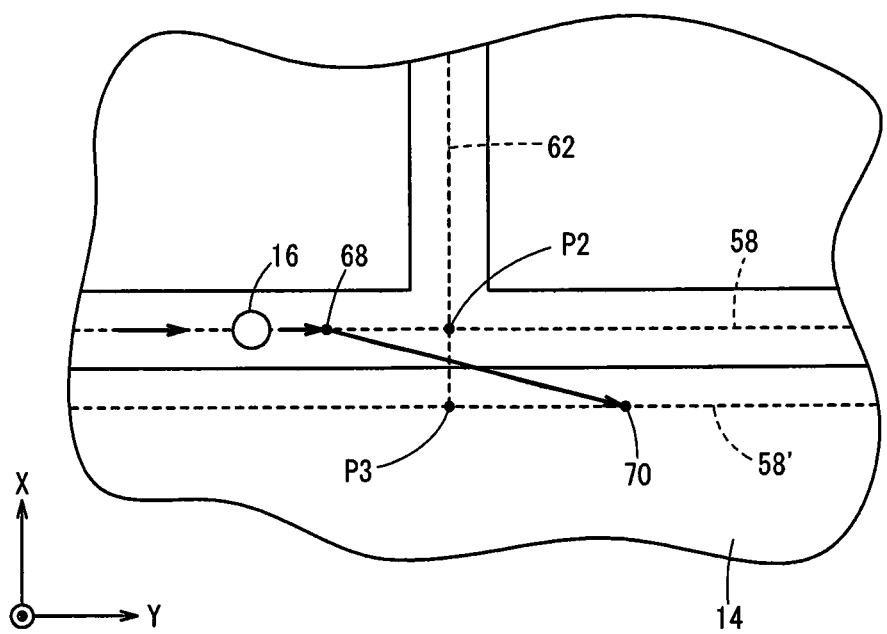
FIG. 7A is a plan view schematically showing how the wire electrode makes a route transition (route 1) in a modified example 2.
Figure 7B:
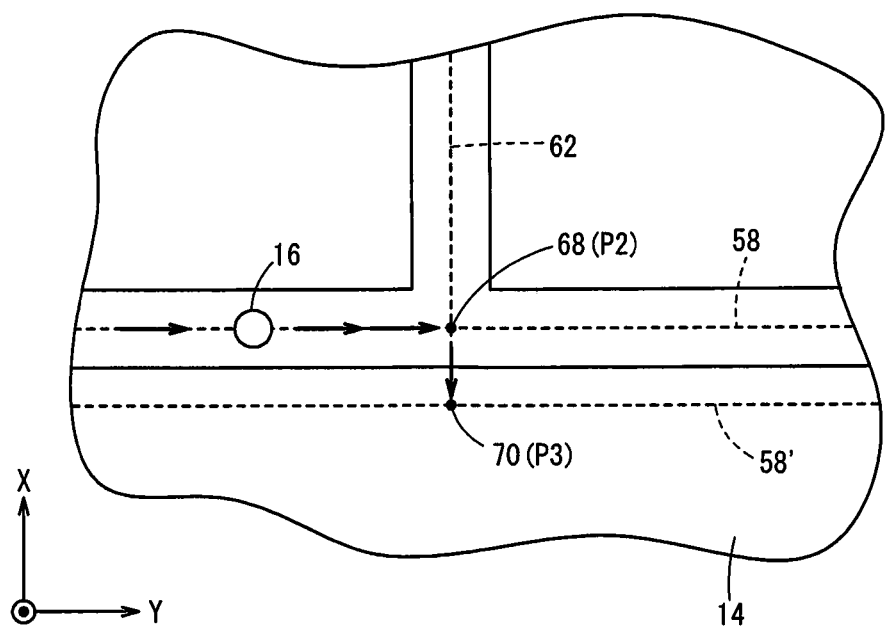
FIG. 7B is a plan view schematically showing how the wire electrode makes a route transition (route 2) in the modified example 2.

FIG. 7A is a plan view schematically showing how the wire electrode 16 makes a route transition (route 1) in a modified example 2. FIG. 7B is a plan view schematically showing how the wire electrode 16 makes a route transition (route 2) in the modified example 2.

The wire movement control unit 56 of the first embodiment causes the wire electrode 16 to make a transition, in a curve, to the machining path 58'. However, the wire movement control unit 56 may cause the wire electrode 16 to make a linear transition to the machining path 58' as shown in FIG. 7A or 7B (arrows in FIGS. 7A and 7B). This would further improve time efficiency compared with the curvilinear transition. In particular, as shown in FIG. 7A, when the transition is made with an oblique angle with respect to the machining path 58' of the second route 66, it is also possible to suppress generation of streaks on the surface of the workpiece 14 as in the first embodiment.

Second Embodiment

Next, a second embodiment will be described. The second embodiment relates to a machining program editor. In the following, the same components as those in the first embodiment are assigned with the same reference numerals, and the description thereof will be omitted as appropriate.

Figure 8:
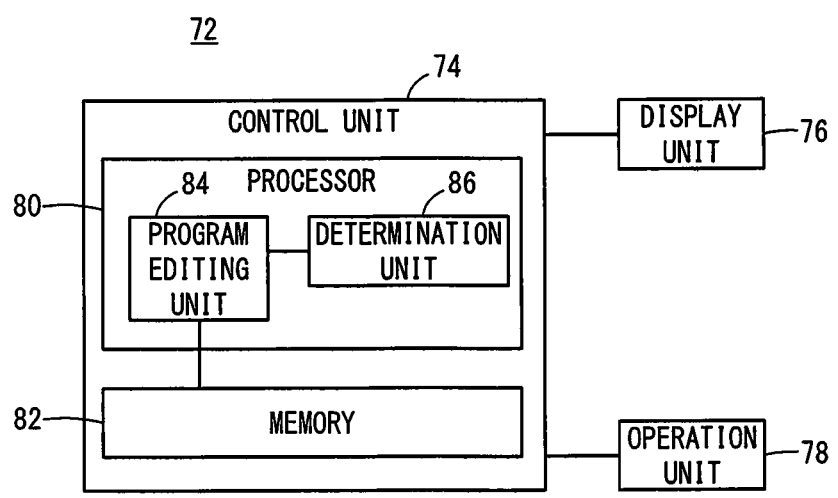
FIG. 8 is a block diagram schematically showing a configuration of a machining program editor according to a second embodiment.

FIG. 8 is a block diagram schematically showing the configuration of a machining program editor 72 according to the second embodiment.

The machining program editor 72 is a device for editing the machining program A in which the movement route of the wire electrode 16 of the wire electrical discharge machine 10 is set. The machining program editor 72 according to this embodiment includes a control unit 74, a display unit 76 and an operation unit 78. The control unit 74 includes a processor 80 and a memory 82 and is able to execute computational processing. The processor 80 of the control unit 74 includes, as functional units, a program editing unit 84 that edits the machining program A and a determination unit 86 that determines the configuration of the movement route of the wire electrode 16 set in the machining program A. The display unit 76 is, for example, a liquid crystal display screen connected to the control unit 74 and appropriately displays the calculation result of the control unit 74 or the like. The operation unit 78 is, for example, a keyboard connected to the control unit 74, and appropriately receives requests from the operator to the control unit 74.

FIG. 9 is a flowchart showing part of a processing flow of the machining program editor 72 according to the second embodiment.

The program editing unit 84 can newly create a machining program A in response to a request from the operator, and also can change the contents of an existing machining program A in response to a request from the operator. Now, an example will be given to describe the operation of the machining program editor 72 when the operator reads the same machining program A as that in the first embodiment into the machining program editor 72 to edit the machining program A.

The machining program A has been stored in advance in the memory 82, for example, and is read into the program editing unit 84 (step S11). Then, the operator may edit the machining program A through the operation unit 78, for example, such as adding paths following the machining path 58 and the machining path 58' (step S12). In this example, the first route 64 and the second route 66 that have been originally set are not particularly changed.

The movement route of the wire electrode 16 set in the edited machining program A is determined by the determination unit 86 after completion of the editing operation by the operator (step S13). Specifically, the determination unit 86 determines whether or not the first route 64 having the approach path 60, the machining path 58 and the escape path 62 is set in the machining program A. The determination unit 86 further determines whether or not the second route 66 having the approach path 60', the machining path 58' and the escape path 62' is set in the machining program A so as to follow the already determined first route 64. Then, when the first route 64 and the second route 66 have been set in the machining program A in this order (determination result: YES), the determination unit 86 requests the program editing unit 84 to automatically edit the machining program A.

In response to the request from the determination unit 86, the program editing unit 84 partially edits the movement route of the wire electrode 16 set in the machining program A (step S14). Specifically, when requested by the determination unit 86, the program editing unit 84 deletes or invalidates the escape path 62 and the approach path 60' set in the machining program A. The program editing unit 84 further sets a route (transition route) through which the wire electrode 16 transitions from the transition start point 68 on the machining path 58 of the first route 64 to the transition end point 70 on the machining path 58' of the second route 66, instead of the escape path 62 and the approach path 60'. Each of the transition start point 68 and the transition end point 70 may be set from respective predetermined ranges on the machining path 58 and the machining path 58', as in the first embodiment. For example, the end point P2 of the machining path 58 may be set as the transition start point 68, and the start point P3 of the machining path 58' may be set as the transition end point 70.

The transition route in plan view may have a linear or curvilinear shape. The automatically edited machining program A is stored in the memory 82 in such a state as to be able to be externally output, for example (step S15). If there is no request for automatic editing of the machining program A from the determination unit 86 (step S13: NO), the program editing unit 84 may store the machining program A in the memory 82 without changing the contents edited by the operator.

When the machining program A automatically edited at step S14 is executed, the wire electrode 16 transitions from the transition start point 68 on the machining path 58 of the first route 64 to the transition end point 70 on the machining path 58' of the second route 66, without making a transition to the escape path 62. Thus, electrical discharge machining in the second route 66 can be started immediately after completion of electrical discharge machining in the first route 64, without the wire electrode 16 passing through the escape path 62 and the approach path 60'.

As has been described above, the machining program editor 72 can determine the movement route of the wire electrode 16 set in the machining program A edited by the operator and edit the machining program A based on the determination result so as to perform efficient relative movement. As a result, by using the edited machining program A, it is possible to shorten the time required for electrical discharge machining by the wire electrical discharge machine 10.

Invention Obtained from the Embodiment

The invention that can be grasped from the above embodiment and modifications will be described below.
<First Invention>

A wire electrical discharge machine (10) that performs electrical discharge machining on a workpiece (14) by generating electric discharges between a wire electrode (16) and the workpiece (14) when moving the wire electrode (16) relative to the workpiece (14) along a machining path (58) of a movement route of the wire electrode (16) while moving the wire electrode (16) relative to the workpiece (14) based on a machining program (A) in which the movement route of the wire electrode (16) is set, the wire electrical discharge machine including: a determination unit (54) configured to determine whether or not a first route (64) and a second route (66) are set in the machining program (A) in this order as the movement route of the wire electrode (16), the first route (64) and the second route (66) each including an approach path (60) configured to cause the wire electrode (16) to approach a start point (P1) of the machining path (58) from a predetermined machining start point (44), the machining path (58), and an escape path (62) configured to retract the wire electrode (16) from an end point (P2) of the machining path (58) to the machining start point (44), the approach path, the machining path, and the escape path being arranged in this order; and a wire movement control unit (56) configured to, when the determination unit (54) has determined that the first route (64) and the second route (66) are set in the machining program (A) in this order as the movement route of the wire electrode (16), move the wire electrode (16) relative to the workpiece (14) so that the wire electrode (16) transitions from the machining path (58) of the first route (64) to the machining path (58') of the second route (66) without moving the wire electrode (16) along the escape path (62) of the first route (64) and the approach path (60') of the second route (66) set in the machining program (A).

As a result, it is possible to shorten the time required by the wire electrical discharge machine (10) to perform electrical discharge machining.

The wire movement control unit (56) may be configured to move the wire electrode (16) relative to the workpiece (14) so that the wire electrode (16) transitions linearly from the first route (64) to the second route (66). This makes it possible to expect a further improvement in time efficiency compared to a case of curvilinear transition.

The wire movement control unit (56) may be configured to move the wire electrode (16) relative to the workpiece (14) so that the wire electrode (16) transitions in a curve from the first route (64) to the second route (66). This makes it possible to suppress generation of streaks on the surface of the workpiece (14).

The wire movement control unit (56) may be configured to, when the determination unit (54) has determined that the first route (64) and the second route (66) are set in the machining program (A) in this order as the movement route of the wire electrode (16), move the wire electrode (16) relative to the workpiece (14) so that the wire electrode (16) transitions from a predetermined transition start point (68) that is determined in advance in a predetermined range of the machining path (58) of the first route (64), including the end point (P2) of the machining path (58) of the first route (64), to a predetermined transition end point (70) that is determined in advance in a predetermined range of the machining path (58') of the second route (66), including the start point (P3) of the machining path (58') of the second route (66). As a result, it is possible to shorten the time required by the wire electrical discharge machine (10) to perform electrical discharge machining.

The transition start point (68) may reside on the first route (64) on an upstream side of the end point (P2) of the machining path (58) of the first route (64). Thus, it is possible to shorten the time required by the wire electrical discharge machine (10) to perform electrical discharge machining. Further, by increasing the distance between the transition start point (68) and the transition end point (70), it is possible to easily cause the wire electrode (16) to transition with an oblique angle with respect to the machining path (58') of the second route (66).

The transition end point (70) may reside on the second route (66) on a downstream side of the start point (P3) of the machining path (58') of the second route (66). It is possible to shorten the time required by the wire electrical discharge machine (10) to perform electrical discharge machining. Further, by increasing the distance between the transition start point (68) and the transition end point (70), it is possible to easily cause the wire electrode (16) to transition with an oblique angle with respect to the machining path (58') of the second route (66).

The wire electrical discharge machine (10) may further include a wire discharge control unit (52) configured to control the electrical discharge machining according to machining conditions. The wire discharge control unit (52) may be configured to calculate, based on the machining conditions for the machining path (58) of the first route (64) and the machining conditions for the machining path (58') of the second route (66), transition machining conditions which are the machining conditions for a period during which the wire electrode (16) transitions from the machining path (58) of the first route (64) to the machining path (58') of the second route (66), and subject the workpiece (14) to the electrical discharge machining in accordance with the calculated transition machining conditions while causing the wire electrode (16) to transition from the machining path (58) of the first route (64) to the machining path (58') of the second route (66). Thus, it is possible to perform electrical discharge machining by connecting the machining paths (58) and (58') while the wire electrode (16) transitions from the transition start point (68) to the transition end point (70).

The wire discharge control unit (52) may be configured to calculate the transition machining conditions so that the transition machining conditions gradually change from the machining conditions for the machining path (58) of the first route (64) to the machining conditions for the machining path (58') of the second route (66). As a result, it is possible to perform electrical discharge machining by connecting the machining paths (58) and (58'), for which the machining conditions are different from each other, while the wire electrode (16) transitions from the transition start point (68) to the transition end point (70).

<Second Invention>

A machining program editor (72) that edits a machining program (A) in which a movement route of a wire electrode (16) of a wire electrical discharge machine (10) is set, the movement route including a machining path (58) used when performing electrical discharge machining on a workpiece (14) while moving the wire electrode (16) relative to the workpiece (14), the machining program editor including: a determination unit (86) configured to determine whether or not a first route (64) and a second route (66) are set in the machining program (A) in this order as the movement route of the wire electrode (16), the first route (64) and the second route (66) each including an approach path (60) configured to cause the wire electrode (16) to approach a start point (P1) of the machining path (58) from a predetermined machining start point (44), the machining path (58), and an escape path (62) configured to retract the wire electrode (16) from an end point (P2) of the machining path (58) to the machining start point (44), the approach path, the machining path, and the escape path being arranged in this order; and a program editing unit (84) configured to, when the determination unit (86) has determined that the first route (64) and the second route (66) are set in the machining program (A) in this order as the movement route of the wire electrode (16), edit the machining program (A) so as to cause the wire electrode (16) to transition from the machining path (58) of the first route (64) to the machining path (58') of the second route (66) without moving the wire electrode (16) along the escape path (62) of the first route (64) and the approach path (60') of the second route (66).

As a result, it is possible to shorten the time required by the wire electrical discharge machine (10) to perform electrical discharge machining.

The program editing unit (84) may be configured to edit the machining program (A) so that the wire electrode (16) transitions linearly from the first route (64) to the second route (66). This makes it possible to expect a further improvement in time efficiency compared to a case of curvilinear transition.

The program editing unit (84) may be configured to edit the machining program (A) so that the wire electrode (16) transitions in a curve from the first route (64) to the second route (66). This makes it possible to suppress generation of streaks on the surface of the workpiece (14).

The program editing unit (84) may be configured to, when the determination unit (86) has determined that the first route (64) and the second route (66) are set in the machining program (A) in this order as the movement route of the wire electrode (16), edit the machining program (A) so that the wire electrode (16) transitions from a predetermined transition start point (68) that is determined in advance in a predetermined range of the machining path (58) of the first route (64), including the end point (P2) of the machining path (58) of the first route (64), to a predetermined transition end point (70) that is determined in advance in a predetermined range of the machining path (58') of the second route (66), including the start point (P3) of the machining path (58') of the second route (66). As a result, it is possible to shorten the time required by the wire electrical discharge machine (10) to perform electrical discharge machining.

The program editing unit (84) may be configured to edit the machining program (A) so that the transition start point (68) is set on the first route (64) on an upstream side of the end point (P2) of the machining path (58) of the first route (64). Thus, it is possible to shorten the time required by the wire electrical discharge machine (10) to perform electrical discharge machining. Further, by increasing the distance between the transition start point (68) and the transition end point (70), it is possible to easily cause the wire electrode (16) to transition with an oblique angle with respect to the machining path (58') of the second route (66).

The program editing unit (84) may be configured to edit the machining program (A) so that the transition end point (70) is set on the second route (66) on a downstream side of the start point (P3) of the machining path (58') of the second route (66). Thus, it is possible to shorten the time required by the wire electrical discharge machine (10) to perform electrical discharge machining. Further, by increasing the distance between the transition start point (68) and the transition end point (70), it is possible to easily cause the wire electrode (16) to transition with an oblique angle with respect to the machining path (58') of the second route (66).

<Third Invention>

A wire electrode moving method of moving a wire electrode (16) when moving the wire electrode (16) relative to a workpiece (14) along a machining path (58) to perform electrical discharge machining on the workpiece (14), the wire electrode moving method including: a determination step of determining whether or not a first route (64) and a second route (66) are specified in this order as a movement route of the wire electrode (16), the first route (64) and the second route (66) each including an approach path (60) configured to cause the wire electrode (16) to approach a start point (P1) of the machining path (58) from a predetermined machining start point (44), the machining path (58), and an escape path (62) configured to retract the wire electrode (16) from an end point (P2) of the machining path (58) to the machining start point (44), the approach path, the machining path, and the escape path being arranged in this order; and a movement step of, when it has been determined at the determination step that the first route (64) and the second route (66) are set in a machining program (A) in this order as the movement route of the wire electrode (16), moving the wire electrode (16) relative to the workpiece (14) so that the wire electrode (16) transitions from the machining path (58) of the first route (64) to the machining path (58') of the second route (66) without moving the wire electrode (16) along the escape path (62) of the first route (64) and the approach path (60') of the second route (66).

As a result, it is possible to shorten the time required by the wire electrical discharge machine (10) to perform electrical discharge machining.

<Fourth Invention>

A machining program editing method for editing a machining program (A) in which a movement route of a wire electrode (16) of a wire electrical discharge machine (10) is set, the movement route including a machining path (58) used when performing electrical discharge machining on a workpiece (14) while moving the wire electrode (16) relative to the workpiece (14), the machining program editing method including: a determination step of determining whether or not a first route (64) and a second route (66) are set in the machining program (A) in this order as the movement route of the wire electrode (16), the first route (64) and the second route (66) each including an approach path (60) configured to cause the wire electrode (16) to approach a start point (P1) of the machining path (58) from a predetermined machining start point (44), the machining path (58), and an escape path (62) configured to retract the wire electrode (16) from an end point (P2) of the machining path (58) to the machining start point (44), the approach path, the machining path, and the escape path being arranged in this order; and a program editing step of, when it has been determined at the determination step that the first route (64) and the second route (66) are set in the machining program (A) in this order as the movement route of the wire electrode (16), editing the machining program (A) so as to cause the wire electrode (16) to transition from the machining path (58) of the first route (64) to the machining path (58') of the second route (66) without moving the wire electrode (16) along the escape path (62) of the first route (64) and the approach path (60') of the second route (66).

As a result, it is possible to shorten the time required by the wire electrical discharge machine (10) to perform electrical discharge machining.

What is claimed is:

1. A wire electrical discharge machine that performs electrical discharge machining on a workpiece by generating electric discharges between a wire electrode and the workpiece when moving the wire electrode relative to the workpiece along a machining path of a movement route of the wire electrode, while moving the wire electrode relative to the workpiece based on a machining program embedded in a non-transitory computer readable medium in which the movement route of the wire electrode is set, the wire electrical discharge machine comprising:
a processor,
wherein the processor
determines whether or not a first route and a second route are set in the machining program embedded in the non-transitory computer readable medium in this order as the movement route of the wire electrode, the first route and the second route each including an approach path configured to cause the wire electrode to approach a start point of the machining path from a predetermined machining start point, the machining path, and an escape path configured to retract the wire electrode from an end point of the machining path to the machining start point, the approach path, the machining path, and the escape path being arranged in this order, and
when the processor has determined that the first route and the second route are set in the machining program embedded in the non-transitory computer readable medium in this order as the movement route of the wire electrode, causes the wire electrode to move relative to the workpiece so that the wire electrode transitions from the machining path of the first route to the machining path of the second route without moving the wire electrode along the escape path of the first route and the approach path of the second route set in the machining program embedded in the non-transitory computer readable medium.

2. The wire electrical discharge machine according to claim 1, wherein the processor causes the wire electrode to move relative to the workpiece so that the wire electrode transitions linearly from the first route to the second route.

3. The wire electrical discharge machine according to claim 1, wherein the processor causes the wire electrode to move relative to the workpiece so that the wire electrode transitions in a curve from the first route to the second route.

4. The wire electrical discharge machine according to claim 1, wherein the processor causes, when the processor has determined that the first route and the second route are set in the machining program embedded in the non-transitory computer readable medium in this order as the movement route of the wire electrode, the wire electrode to move relative to the workpiece so that the wire electrode transitions from a predetermined transition start point that is determined in advance in a predetermined range of the machining path of the first route, including the end point of the machining path of the first route, to a predetermined transition end point that is determined in advance in a predetermined range of the machining path of the second route, including the start point of the machining path of the second route.

5. The wire electrical discharge machine according to claim 4, wherein the transition start point resides on the first route on an upstream side of the end point of the machining path of the first route.

6. The wire electrical discharge machine according to claim 4, wherein the transition end point resides on the second route on a downstream side of the start point of the machining path of the second route.

7. The wire electrical discharge machine according to claim 1, wherein the processor is configured to control the electrical discharge machining according to machining conditions,
wherein the processor is configured to calculate, based on the machining conditions for the machining path of the first route and the machining conditions for the machining path of the second route, transition machining conditions which are the machining conditions for a period during which the wire electrode transitions from the machining path of the first route to the machining path of the second route, and subject the workpiece to the electrical discharge machining in accordance with the calculated transition machining conditions while causing the wire electrode to transition from the machining path of the first route to the machining path of the second route.

8. The wire electrical discharge machine according to claim 7, wherein the processor calculates the transition machining conditions so that the transition machining conditions gradually change from the machining conditions for the machining path of the first route to the machining conditions for the machining path of the second route.

9. A machining program editor that edits a machining program embedded in a non-transitory computer readable medium in which a movement route of a wire electrode of a wire electrical discharge machine is set, the movement route including a machining path used when performing electrical discharge machining on a workpiece while moving the wire electrode relative to the workpiece, the machining program editor comprising:
 a processor,
 wherein the processor
 determines whether or not a first route and a second route are set in the machining program embedded in the non-transitory computer readable medium in this order as the movement route of the wire electrode, the first route and the second route each including an approach path configured to cause the wire electrode to approach a start point of the machining path from a predetermined machining start point, the machining path, and an escape path configured to retract the wire electrode from an end point of the machining path to the machining start point, the approach path, the machining path, and the escape path being arranged in this order, and
 when the processor has determined that the first route and the second route are set in the machining program embedded in the non-transitory computer readable medium in this order as the movement route of the wire electrode, edits the machining program embedded in the non-transitory computer readable medium so as to cause the wire electrode to transition from the machining path of the first route to the machining path of the second route without moving the wire electrode along the escape path of the first route and the approach path of the second route.

10. The machining program editor according to claim 9, wherein the processor edits the machining program embedded in the non-transitory computer readable medium so that the wire electrode transitions linearly from the first route to the second route.

11. The machining program editor according to claim 9, wherein the processor edits the machining program embedded in the non-transitory computer readable medium so that the wire electrode transitions in a curve from the first route to the second route.

12. The machining program editor according to claim 9, wherein when the processor has determined that the first route and the second route are set in the machining program embedded in the non-transitory computer readable medium in this order as the movement route of the wire electrode, the processor edits the machining program embedded in the non-transitory computer readable medium so that the wire electrode transitions from a predetermined transition start point that is determined in advance in a predetermined range of the machining path of the first route, including the end point of the machining path of the first route, to a predetermined transition end point that is determined in advance in a predetermined range of the machining path of the second route, including the start point of the machining path of the second route.

13. The machining program editor according to claim 12, wherein the processor edits the machining program embedded in the non-transitory computer readable medium so that the transition start point is set on the first route on an upstream side of the end point of the machining path of the first route.

14. The machining program editor according to claim 12, wherein the processor edits the machining program embedded in the non-transitory computer readable medium so that the transition end point is set on the second route on a downstream side of the start point of the machining path of the second route.

15. A wire electrode moving method of moving a wire electrode when moving the wire electrode relative to a workpiece along a machining path to perform electrical discharge machining on the workpiece, the wire electrode moving method comprising:
 a determination step of determining whether or not a first route and a second route are specified in this order as a movement route of the wire electrode, the first route and the second route each including an approach path configured to cause the wire electrode to approach a start point of the machining path from a predetermined machining start point, the machining path, and an escape path configured to retract the wire electrode from an end point of the machining path to the machining start point, the approach path, the machining path, and the escape path being arranged in this order; and
 a movement step of, when it has been determined at the determination step that the first route and the second route are set in a machining program embedded in the non-transitory computer readable medium in this order as the movement route of the wire electrode, moving the wire electrode relative to the workpiece so that the wire electrode transitions from the machining path of the first route to the machining path of the second route without moving the wire electrode along the escape path of the first route and the approach path of the second route.

16. A machining program editing method for causing a processor to edit a machining program embedded in the non-transitory computer readable medium in which a movement route of a wire electrode of a wire electrical discharge machine is set, the movement route including a machining path used when performing electrical discharge machining on a workpiece while moving the wire electrode relative to the workpiece, wherein the processor executes:
 a determination step of determining whether or not a first route and a second route are set in the machining program embedded in the non-transitory computer readable medium in this order as the movement route of the wire electrode, the first route and the second route each including an approach path configured to cause the wire electrode to approach a start point of the machining path from a predetermined machining start point, the machining path, and an escape path configured to retract the wire electrode from an end point of the machining path to the machining start point, the approach path, the machining path, and the escape path being arranged in this order; and a program editing step of, when it has been determined at the determination step that the first route and the second route are set in the machining program embedded in the non-transitory computer readable medium in this order as the movement route of the wire electrode, editing the machining program embedded in the non-transitory computer readable medium so as to cause the wire electrode to transition from the machining path of the first route to the machining path of the second route without moving the wire electrode along the escape path of the first route and the approach path of the second route.

\* \* \* \* \*